United States Patent [19]
Clarey et al.

[11] Patent Number: 5,280,132
[45] Date of Patent: * Jan. 18, 1994

[54] PLASTIC ENCLOSURE BOX FOR ELECTRICAL APPARATUS

[75] Inventors: Robert J. Clarey, Brookfield; Richard A. Reiner, Colgate, both of Wis.

[73] Assignee: Eaton Corporation, Cleveland, Ohio

[*] Notice: The portion of the term of this patent subsequent to Nov. 19, 2008 has been disclaimed.

[21] Appl. No.: 755,470

[22] Filed: Sep. 5, 1991

Related U.S. Application Data

[63] Continuation-in-part of Ser. No. 426,839, Oct. 26, 1989, Pat. No. 5,066,832.

[51] Int. Cl.⁵ .............................................. H05K 5/00
[52] U.S. Cl. ........................................ 174/50; 174/51; 174/65 R; 220/4.02; 220/4.03
[58] Field of Search ......... 174/50, 51, 65 R, 151, 53; 248/56; 361/356, 390; 220/4.02, 4.03

[56] References Cited

U.S. PATENT DOCUMENTS

| D. 318,651 | 7/1991 | Sharp et al. | D13/160 |
| D. 318,652 | 7/1991 | Buchanan | D13/160 |
| 3,634,598 | 1/1972 | Stanfield | 174/51 |
| 3,728,470 | 4/1973 | Maier | 174/58 |
| 3,742,119 | 6/1973 | Newman | 174/65 R |
| 4,710,853 | 12/1987 | Reinhardt | 361/391 |
| 4,731,501 | 3/1988 | Clark et al. | 174/65 R |
| 5,066,832 | 11/1991 | Clarey et al. | 174/50 |

FOREIGN PATENT DOCUMENTS 2036976  2/1972 Fed. Rep. of Germany .... 174/65 R
2626343 12/1977 Fed. Rep. of Germany .... 174/65 R

OTHER PUBLICATIONS

"Trilliant" TM Home Power System, Square D Co., Copyright 1990, Catalog SD470, 12 pages.

Primary Examiner—Leo P. Picard
Assistant Examiner—David A. Tone
Attorney, Agent, or Firm—L. G. Vande Zande

[57] ABSTRACT

A plastic load center box economically provided by duplicate molded end sections joined by an intermediate section of uniform cross-section which is readily provided in selected lengths in either molded or extruded form. End walls receive metal inserts electrically interconnected to provide grounding when attached to grounded conduit, or plastic inserts where the load center application does not require grounded conduit. Molded end sections have formed knockouts and wire clamping tabs. A metal cover for the box is grounded to the metal inserts or to the interconnection. Additional plastic inserts in the end walls provide forwardly open pockets in which cable may be laid, and closing inserts overlying the pockets to grip the cable and retain it in the pockets.

19 Claims, 5 Drawing Sheets

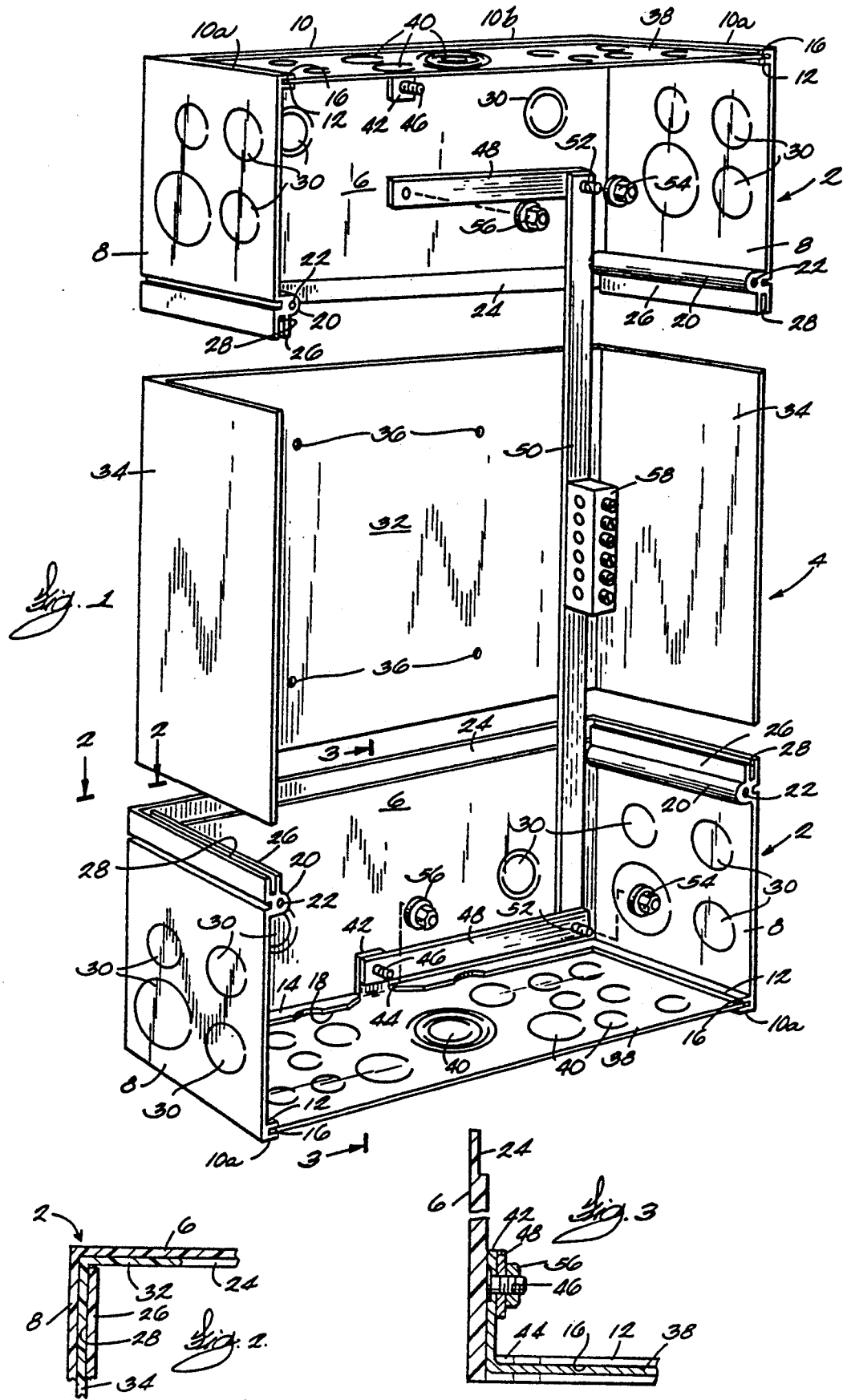

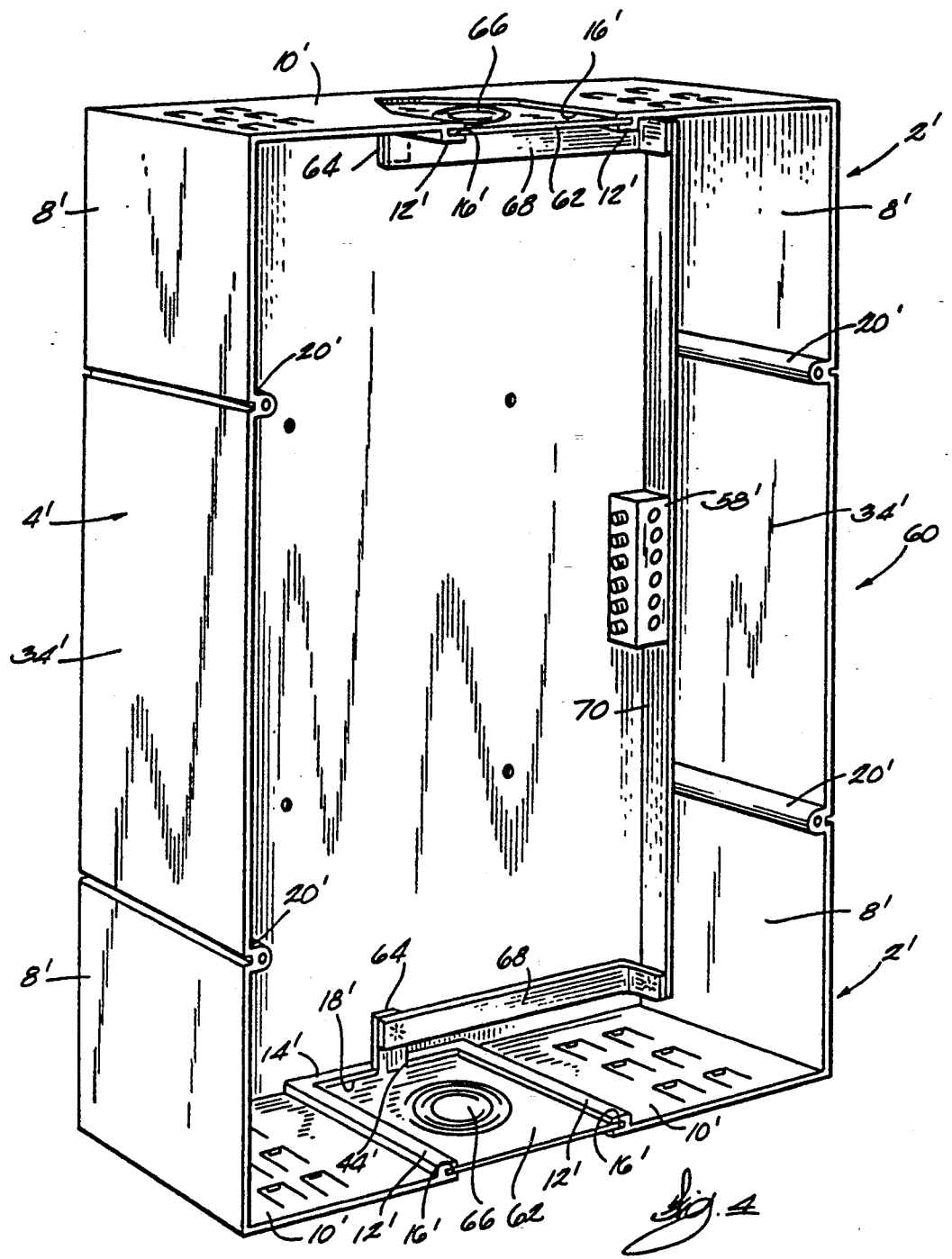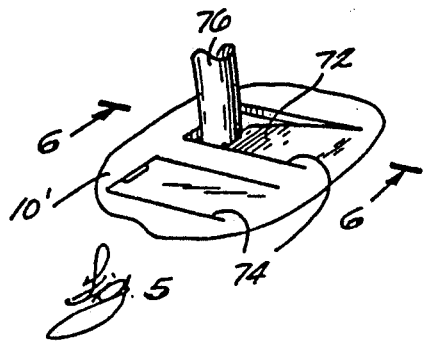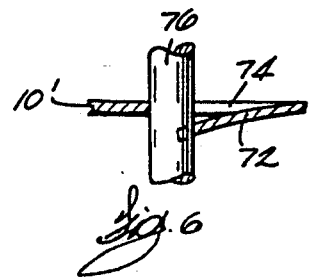

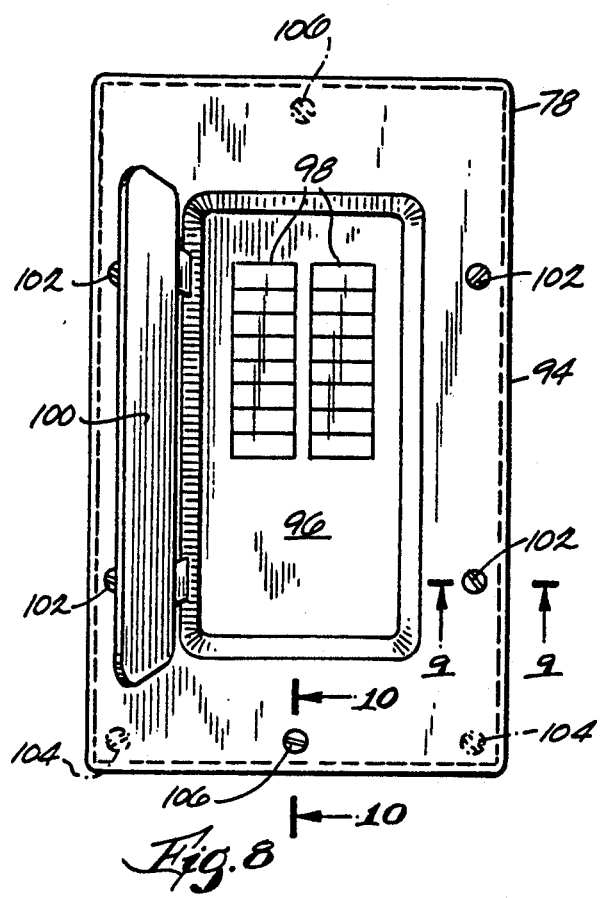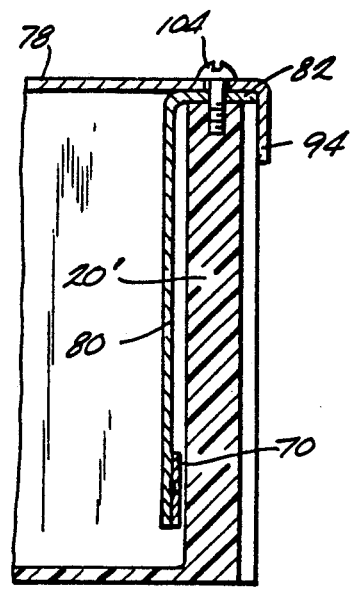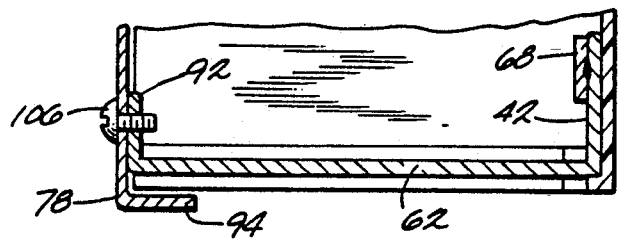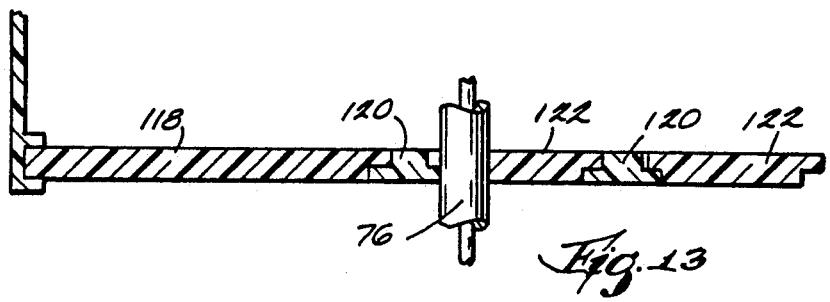

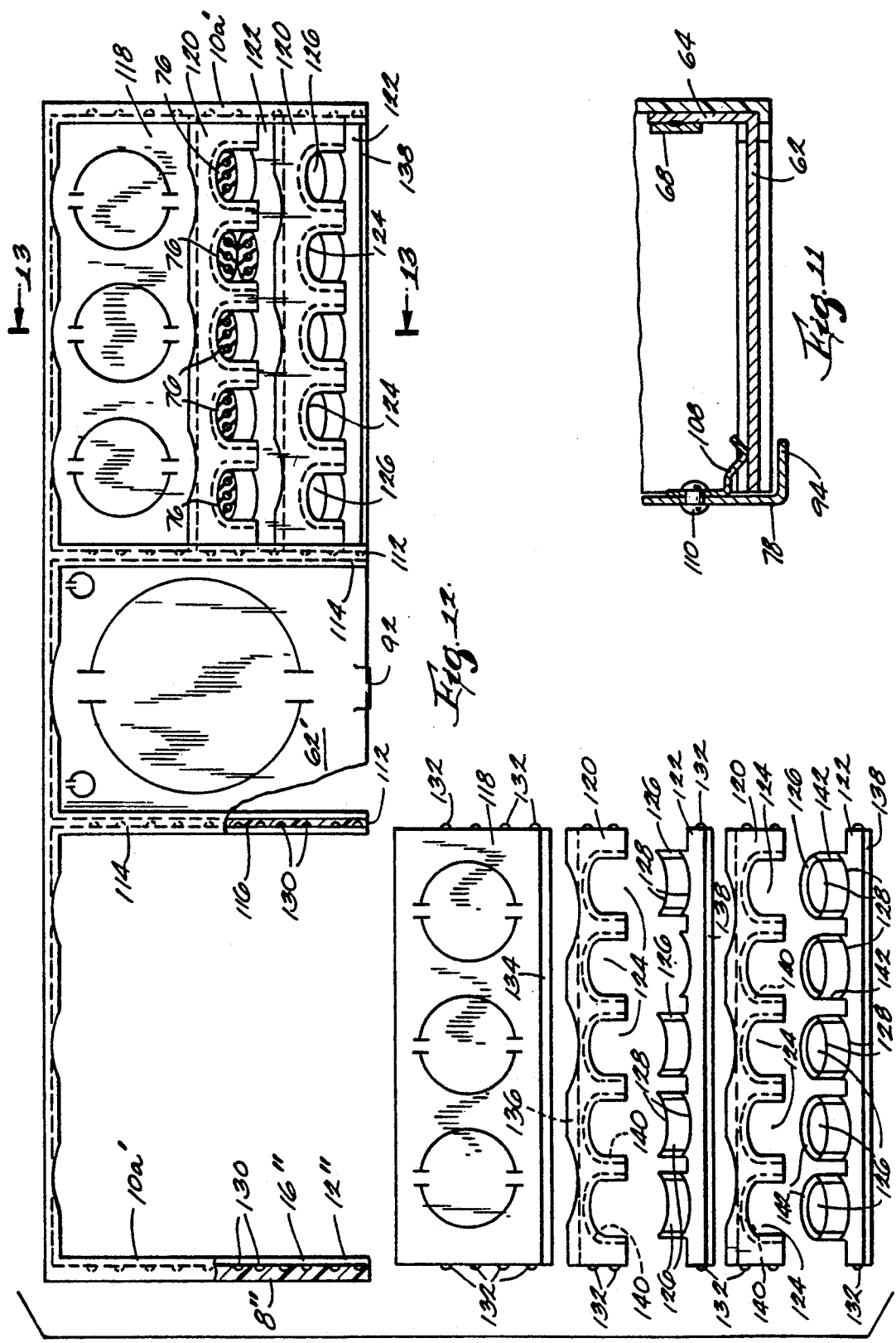

PLASTIC ENCLOSURE BOX FOR ELECTRICAL APPARATUS

This application is a continuation-in-part of U.S. Patent application Ser. No. 07/426,839 filed Oct. 26, 1989, and now U.S. Pat. No. 5,066,832.

BACKGROUND OF THE INVENTION

This invention relates to plastic enclosures for electrical apparatus, and more particularly to plastic enclosure boxes for load centers. Still more particularly, the invention relates to plastic boxes of the aforementioned type which may be used in an electrically grounded system.

The use of molded plastic enclosures for electrical apparatus in place of formed and fabricated sheet metal enclosures is increasing. Although the manufacturing cost for molded plastic enclosures is slightly greater than the manufacturing cost for highly tooled fabrication of a comparable sheet metal enclosure, the plastic enclosures offer several advantages over the sheet metal enclosures. For example, a plastic enclosure box can be made quicker and with fewer manufacturing steps (e.g. welding and painting), than a comparably formed and fabricated sheet metal box. The plastic box may be colored and is corrosion resistant without painting. Sharp edges and corners of the sheet metal enclosures, which offer potentially sharp cutting edges, are avoided in plastic enclosures by providing fillets and radii where appropriate. Moreover, the plastic enclosure is electrically insulative, thereby reducing electrical shock hazard of the enclosure and eliminating certain insulators required in metal boxes. Still another advantage is that many incidental features such as mounting, attachment and snap-together structure and the like can be readily incorporated in the molded plastic enclosure. Perhaps the most significant advantage afforded by the plastic enclosures is that they are lighter and stronger, i.e. more resistive to damage, than the sheet metal counterpart, and therefore lessen the shipping costs of the enclosures.

The foregoing advantages of molded plastic enclosures notwithstanding, electrical load centers provide certain unique considerations which have not been readily met by molded plastic technology. For example, load center enclosure boxes are provided in several lengths according to the number of circuits to be provided in the load center. Therefore, each load center having a different capacity would require its own molded enclosure box. Alternatively, a single enclosure box large enough to accommodate all sizes of interior panels and circuit capacities could be used, resulting in wasted space within the interior of the enclosure box for all but the largest capacity load center. Furthermore, a load center may be used as service entrance equipment, in which case the metal box becomes a part of an electrically grounded system, or it may be used as a sub-fed device (i.e. in a multiple unit dwelling) wherein the box is not required to be a part of the electrical grounding system. The particular end use of a given load center is not known at the time of its manufacture and perhaps not known at the time it is sold from distributor stock. Thus, where it is desired to use a plastic enclosure box in a grounded system application, it is necessary to provide special grounding attachment hardware on the conduit or metallic sheath cable which is connected to the box. While the molded load center box may incorporate features and advantages in sufficient numbers to justify extra cost, the various size cover-trims for such boxes may not justify the cost of plastic, and a metal cover-trims may be provided. The special grounding hardware should also accommodate grounding the cover-trims.

SUMMARY OF THE INVENTION

This invention provides a plastic enclosure box for electrical apparatus which is particularly well suited for electrical load centers. It provides a molded end section which has knockout and/or non-metallic sheathed cable retention features molded into the walls thereof and which is used in pairs, attached at opposite ends of an extruded intermediate channel-shaped section of selective length, to provide a load center of a selective length. The end section is structured to receive the intermediate channel-shaped section in an overlapped relation which facilitates attachment of the two sections together. The end wall of the molded end section is provided with an opening having opposed grooves at its edges to slidably receive a filler plate which may be plastic or metal according to the desired use of the load center. Metal plates inserted at each end are joined together within the box by an electrically conductive strap which also serves to mount a neutral or equipment ground assembly wiring connector within the box. The metal plates have tabs at their forward edge bent for flush engagement by a metal cover for the box, thereby to ground the cover. Separate forwardly extending conductive straps may be attached to the conductive strap within the box to alternatively provide a grounding tab or tabs for the cover. Additional openings in the end walls slidably receive cable retainers to facilitate stringing wire cable when using the box. Other features and advantages provided by this invention will become readily apparent when reading the following description and claims in conjunction with the accompanying drawings.

BRIEF DESCRIPTION OF THE DRAWINGS

FIG. 1 is an exploded view of an unassembled plastic enclosure box in accordance with this invention;

FIG. 2 is a fragmentary cross sectional view taken generally along the line 2—2 in FIG. 1 after the intermediate section and end section have been assembled together;

FIG. 3 is a fragmentary cross sectional view taken along the line 3—3 in FIG. 1 showing a grounding strap connection to a metal insert plate in accordance with this invention;

FIG. 4 is a perspective view of a one piece plastic enclosure box having an alternate form of metal insert plate and electrical grounding strap;

FIG. 5 is a fragmentary perspective view of a cable retention feature incorporated into a molded end section of the plastic enclosure box of this invention;

FIG. 6 is a cross sectional view of the cable retention feature taken along the line 6—6 in FIG. 5;

FIG. 8 is a front elevational view of the enclosure box of this invention having a cover attached thereto, drawn to a reduced scale;

FIG. 9 is a cross sectional view of a cover grounding feature taken along the line 9—9 in FIG. 8;

FIG. 10 is a cross sectional view of another cover grounding feature taken along the line 10—10 in FIG. 8;

FIG. 11 is a cross sectional view of the assembled box and cover similar to FIG. 10, but showing an alternate grounding method;

FIG. 12 is an end view of the plastic enclosure box of this invention shown partially in exploded format; and FIG. 13 is a cross sectional view taken along the line 13—13 in FIG. 12.

DETAILED DESCRIPTION OF THE PREFERRED EMBODIMENTS

Figure 7:
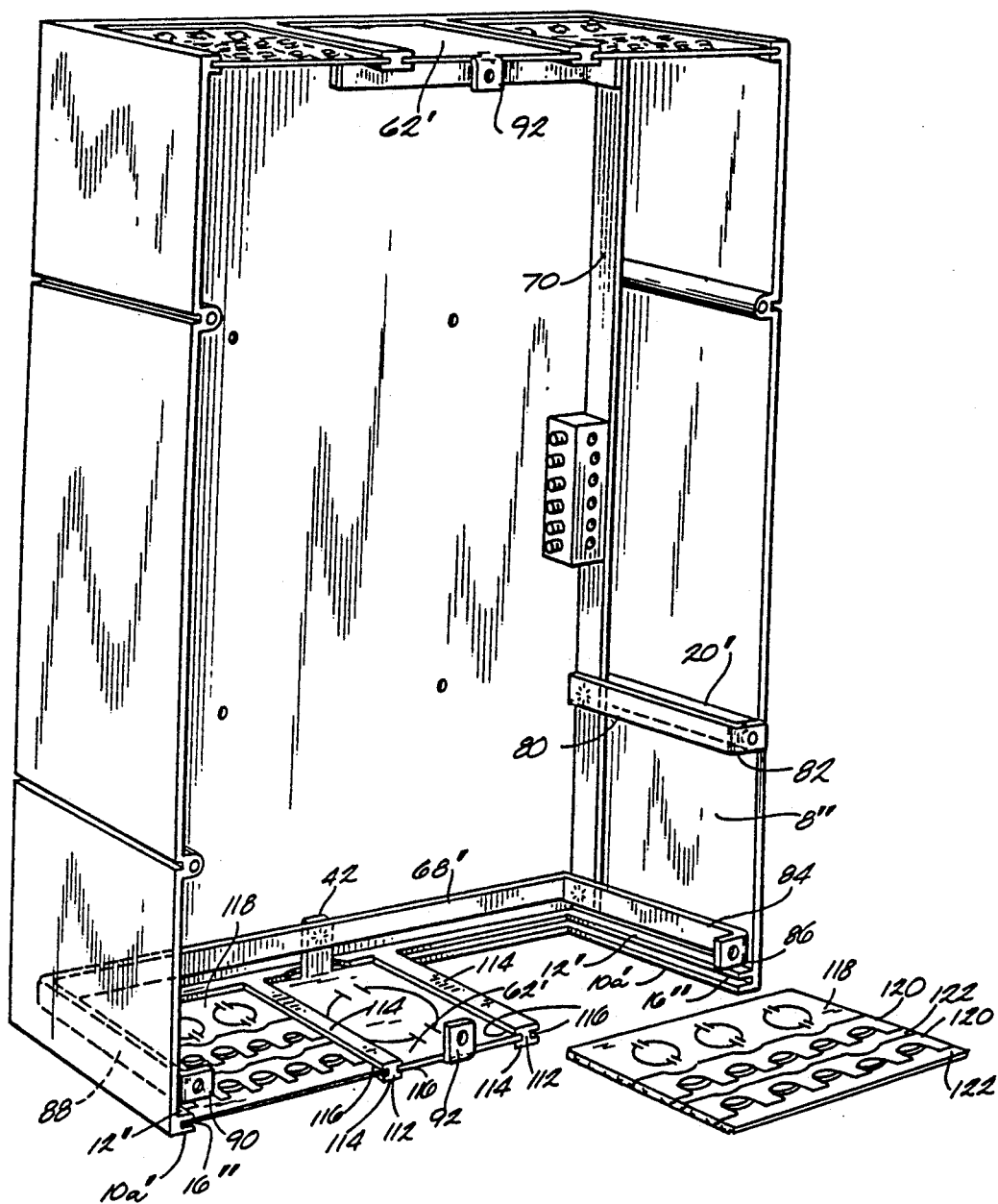
FIG. 7 is a perspective view of a one piece plastic enclosure box showing grounding provisions for a metal cover.

Referring to FIG. 1 of the drawings, a plastic enclosure box for a load center constructed according to this invention is illustrated in a disassembled state. The plastic box preferably comprises a pair of molded end sections 2 which are joined together by an intermediate section 4. Inasmuch as economy of scale is a significant factor in providing a plastic load center box which is cost comparable to the equivalent sheet metal box, the end sections 2 are preferably the same part used in duplication although it is contemplated that such end sections may be different from each other in length, knockout arrangement, etc. Moreover, the end section 2 is usable in pairs for each length variation of load center offered by the manufacturer. Intermediate channel-shape section 4 is preferably economically produced as an extruded channel which is subsequently cut to the desired length to provide a variety of load center boxes in various selectively predetermined lengths although this section may alternatively be provided as a sheet steel channel.

Molded end section 2 comprises a rear wall 6, side walls 8 extending forwardly from rear wall 6, and an end wall 10 contiguous with side walls 8 and extending forwardly from rear wall 6. With specific reference to the end section 2 shown in FIG. 1, end wall 10 consists only of a pair of stub portions 10a having a pair of coextensive ribs 12 extending front to rear immediately adjacent side walls 8 and a stub portion 10b located immediately adjacent rear wall 6 having a coextensive rib 14. Ribs 12 and wall portions 10a are spaced to provide front-to-rear extending grooves 16 and rib 14 and wall portion 10b are spaced to provide a groove 18 proximate the rear wall 6. Side walls 8 have front-to-rear extending tubular bosses 20 provided with holes 22 in the front surface thereof for receiving fasteners for a cover (as will later be described) for the load center. The inner edge of rear wall 6 is provided with a reduced thickness ledge 24. Ribs 26 are provided adjacent the inner edges of side walls 8, the ribs 26 extending from tubular bosses 20 and being spaced from the side wall 8 to provide a groove 28 along the inner edge of each side wall. Ribs 26 stop short of the reduced thickness ledge 24 at the rear wall 6 as best seen in FIG. 2. A plurality of circular knockouts 30 are molded in side walls 8 and in rear wall 6. The vertical length of side walls 8 and rear wall 6 with regard to the orientation shown in the drawing is selected to provide adequate surface for a desired number of knockouts or non-metallic sheathed cable retention tabs which will be described hereinafter.

Intermediate section 4 has a rear wall 32 and side walls 34 extending forwardly from opposite sides thereof. The length of section 4 end-to-end is variably selected to provide a box of the desired length and circuit capacity. A plurality of holes 36 may be provided in rear wall 32 by a secondary operation in the manufacture of intermediate section 4 to function as mounting holes for the interior panel of the load center. End sections 2 are attached at opposite ends of intermediate section 4 by bringing the respective sections together such that the edges of side walls 34 are received within grooves 28 in an overlapping relation and the edges of rear wall 32 overlap reduced thickness ledges 24. The respective sections may be bonded together in the overlapped area by applying an adhesive or by an ultrasonic welding method, or by incorporating fasteners or snap fastening means in the overlapped area, or by other appropriate fastening means.

When the plastic box load center is to be used in a grounded system, a metal plate 38 is inserted into grooves 16 and 18 in end wall 10 of end sections 2. Plate 38 is provided with a plurality of knockouts 40 for attachment of grounded conduit or cable. A tab 42, bent at right angles to the major plane of plate 38, extends through a notch 44 in interior rib 14. In the embodiment depicted in FIGS. 1 and 3, a threaded self-clinching stud 46 is affixed to tab 42 to project outwardly therefrom. A conductive strap assembly comprising a pair of identical lateral straps 48 and a longitudinal strap 50 is secured together by threaded self-clinching studs 52 affixed at the ends of longitudinal strap 50 (similar to studs 46) and nuts 54 threaded to studs 52. The ends of lateral straps 48 remote from strap 50 have clearance holes disposed over studs 42 of tabs 44 and are bolted thereagainst by nuts 56 threaded upon studs 46. A multi-apertured wiring connector assembly 58 is attached to strap 50 to provide a neutral bar wiring connector for the load center.

An alternative embodiment is shown in FIG. 4, wherein the plastic enclosure box 60 is molded as a single member. However, it is contemplated that many of the same advantages of the three piece box described above are accomplished in the molding process by utilizing duplicated dies for the respective end sections 2' and that the die for intermediate section 4' comprising the vertical span between tubular bosses 20' can be of a selected predetermined length. In this embodiment, the end walls 10' of end sections 2' extend further from side walls 8' toward the center of box 60. Ribs 12' extending front-to-rear in spaced relation to edges of wall 10' defining an opening in the end wall join with a lateral rib 14' spaced from end wall 10' adjacent rear wall 6' to define grooves 16' and 18' as in the embodiment of FIG. 1. A metal plate 62 having a tab 64 formed at right angles thereto is inserted into grooves 16' and 18' to close off the opening. Tab 64 projects through a notch 44' in rib 14'. Plate 62 has at least one knockout 66. An alternative conductor strap assembly is provided in the embodiment of FIG. 4. This assembly comprises a pair of lateral straps 68 permanently attached to the ends of a longitudinal strap 70 such as by welding or the like. The opposite ends of lateral straps 68 are permanently attached to tabs 64 of the respective metal plates 62 also by welding or the like. The complete conductor strap assembly, including plates 62, is assembled to the plastic box as a unit, sliding the plates 62 into grooves 16' until they seat against the bottom of grooves 18'. Moreover, the longitudinal strap 70 may be disposed in a plane parallel to the plane of side walls 8' and 34' by bending the lateral straps 68 at right angles near their attachment to strap 70 as can be seen in the drawing. A multi-aperture wire connector 58' is attached to strap 70 to provide a neutral bar connector for the box.

If a metal cover-trim 78 is to be used with a plastic box as constructed in either the FIG. 1 or FIG. 4 embodiments, means may be provided for grounding the cover as shown in FIGS. 7 and 9–11. This grounding means is attached to or a part of the conductor strap assembly, which includes metal end plates such as 62, and extends to the front of the enclosure box to abut the metal cover-trim. As seen in FIGS. 7 and 9, this may be a conductive strap 80 attached to longitudinal strap 70, such as by welding or the like, adjacent one of the tubular bosses 20'. The forward end of strap 80 is bent over substantially at right angles to the major plane thereof to provide a tab 82 which overlies the particular adjacent boss 20' at the front surface of the box. Tab 82 has a hole which is aligned with the hole in boss 20'.

Another embodiment of cover-trim grounding strap is shown along the lower interior edge of the box in FIG. 7. Lateral strap 68 of FIG. 4 may be modified to include a longer forwardly directed strap portion 84 extending along the side wall of end section 8' in FIG. 7. The forward end of strap portion 84 is bent at substantially right angles to the major plane of the strap portion to provide a tab 86 having a hole therein. Modified lateral strap 68' shown in FIG. 7 may also extend leftward from tab 42 to the left-hand wall of the box. A second forwardly projecting strap portion 88 may be formed on the left-hand end of strap 68' terminating in a right angle tab 90 in the lower left-hand corner of the box.

Yet another embodiment for grounding the cover-trim, and perhaps the simplest and most economical, is to provide a right angle tab 92 on the forward edge of metal plate 62' shown in FIG. 7. The tab may be a separate right angle bracket welded or otherwise attached to the plate 62', but preferably is an integral part of the plate bent to a right angle with the major plane of the plate. The tab 92 has a hole therethrough, as do the tabs 86 and 90.

FIG. 8 shows metal cover-trim 78 of the enclosure positioned in place over the open front of the box. The particular shape or configuration of cover-trim 78 is not material to this invention, but typically comprises a peripheral flange 94 (best seen in FIGS. 9–11) extending rearwardly from a generally planar front surface. A central area 96 of the front surface is recessed and provided with one or two rows of rectangular knock-outs or twist-outs 98 which may be selectively removed to provide access to the distribution switching equipment located therebehind, mounted on the distribution panelboard. A door 100 is hinged to the cover-trim 78 to cover the recessed central area 96 and switching equipment. Cover-trim 78 is mounted to the box by four thread cutting screws 102 threadably inserted through appropriate clearance holes in the front surface of cover-trim 78 aligned with respective holes in bosses 20' to threadably engage the latter holes. In the embodiment comprising conductive strap 80, one of the screws 102 also passes through the hole in tab 82, clamping tab 82 securely against the cover-trim, and making a good ground connection with the grounding assembly. In the embodiment comprising one or both strap portions 84 and/or 88, additional holes are provided in cover-trim 78 aligned with the holes in tabs 86 and/or 90 to receive thread cutting screws 104 therethrough, threadably engaging the holes in the tabs 86 and 90, to securely clamp the tabs firmly against the cover-trim and make a good ground connection with the grounding assembly. Still other holes may be provided in cover-trim 78 aligned with holes in tabs 92 to receive screws 106 for the FIG. 10 grounding embodiment. It is to be recognized that while FIGS. 7 and 8 show most of the various embodiments for grounding the cover-trim 78, only one point of grounding connection is likely to be used, and provided, in a load center. Since screws 102 are threaded into holes in the plastic cylindrical bosses 20, 20', the cover-trim 78 is electrically isolated from the box without the grounding provision. Accordingly, plastic screws or fasteners may be used to secure cover-trim 78 to the box, using a metal screw only where connection of a metal cover-trim to a grounding tab is required.

Still another embodiment for grounding the cover-trim 78 is shown in FIG. 11. As may be seen, a spring 108 made from conductive material is affixed to cover-trim 78 by a rivet 110, or by welding or other suitable attachment method. Spring 108 extends rearward, spaced from flange 94, in the area of plates 62 on the top, bottom, or both edges of the cover-trim. The distal end of spring 108 is V-shaped to provide a cam surface which is engaged and deflected by metal plate 62 upon positioning cover-trim 78 over the open front side of the box. In this embodiment, the plates 62 and the spring 108 are necessarily plated, instead of being painted, to ensure electrical connection therebetween.

Either box shown and described in FIG. 1 or FIG. 4 may have the conductor strap assembly and metal end plates omitted when the load center is not part of a grounded system. In this instance, plastic plates of identical size to plates 38 or 62 are provided to be inserted in the appropriate grooves to close off the openings in the end walls 10 or 10'. The plastic plates may be provided with knockouts or, more appropriately for the ungrounded system, with flexible non-metallic sheathed cable retaining tabs 72 as seen in FIGS. 4–6. Tabs 72 are cantilevered arms created by forming U-shaped slits 74 in the plastic wall. By inserting a non-metallic sheathed cable through the wall of the box at the free end of tab 72, the tab is deflected inwardly as shown in FIGS. 5 and 6 whereby the free end of tab 72 pinches into the insulating sheathing of cable 76 to pinch the cable between the end of tab 72 and the end of slot 74, thereby preventing its inadvertent withdrawal from the box. Tab 72 may be duplicated in the end walls 10' and may be provided in the plastic insert plates in various patterns and in various combinations with circular knockouts.

Another embodiment of end wall construction for either the one-piece or multi-piece box is shown in FIGS. 7 and 12. In this embodiment, the pair of coextensive wall portions 10a' and ribs 12" extending front to rear immediately adjacent the side walls 8" define grooves 16". A pair of forwardly extending spaced posts 112, located inwardly of the side walls, have coextensive spaced ribs 114 thereon to define forwardly directed grooves 116. Metal plates 62' may be slid into the grooves 116 from the open front surface of the box as aforedescribed. However, as will be noted, the end wall has two additional openings, one on either side of the metal plate 62', defined by the posts 112 having grooves 116 and the respective adjacent ribs 12" and wall portions 10a'. These openings may be filled by plastic plates containing knockouts such as plates 118. The openings may also be filled by a plurality of plastic cable retention plates such as 120, 122, or by a combination of plates 118, 120, 122 as is shown in FIGS. 7 and 12. The cable retention plates are arranged in cooperative pairs as shown best in FIG. 12, a first plate 120 comprising a plurality of forwardly open pockets 124 along a forward edge thereof. A second plate 122 provides a plurality of fingers 126 along a rear edge thereof mutually adjacent the forward edge of plate 120. Fingers 126 are aligned with pockets 124 and are complementally shaped to the pockets to project rearwardly thereinto, filling the pockets. Fingers 126 are provided with score lines 128 which define breakaway segments of each finger. If a single segment is broken away from the distal end of a finger 126, the remaining portion of the finger defines, with the pocket 124, an opening for a non-metallic sheathed cable such as cable 76. If two segments of a finger are broken away, an opening for two cables 76 is provided.

In order that retention plates 120, 122 provide a compressive grip on the sheath of cable 76, a detent or latch structure is preferably provided for the retention plates within the respective opening of the box. As seen in FIG. 12, the bottom surface of grooves 16" and 116 are provided with a series of shallow dimples 130, and the ends of plates 118, 120 and 122 are provided with cooperating semispherical or semicylindrical bosses 132. The inherent resiliency of the material and the wall structure enables the plates to be slid into and out of the openings, while the engagement of bosses 132 in dimples 130 holds the plates in position.

The cable retention plates afford a significant advantage to the installer of the electrical distribution panelboard. Instead of inserting cables through openings in a plate or an end wall of the enclosure box, the same may be simply laid into respective pockets 124 of a retention plate 120. When the pockets are filled, a plate 122 having the appropriate finger segments broken away is inserted over the plate 120 to retain the cables positioned within the box. Additional cable capacity is obtained by inserting a second plate 120 over the installed plate 122, and using a second plate 122 to retain additional cables in place. Although separate plates 120 and 122 are disclosed as being used in pairs, it is anticipated that the inner plates 122 and 120 of FIG. 8 could be replaced by a single plate having fingers 126 projecting from a rear edge and pockets 124 formed in a forward edge.

The plates 118 and 120 are provided with complementally grooved edges 134 and 136 seen in FIG. 12. These edges overlap when the plates are inserted within the appropriate opening in the enclosure box end wall to prevent straight through openings into the interior of the box. Plate 122 is also provided with a grooved edge 138 that overlaps edge 136 on plate 120 when the plates 120 and 122 are adjacent each other. Similarly, the edges of pockets 124 and 126 are complementally grooved at 140 and 142 to also provide an overlapped condition when assembled.

The foregoing has described a plastic enclosure box for load centers which is particularly well suited for plastic fabrication. The box of this invention employs a pair of like end sections attached to an extruded intermediate section of selected length. Alternatively the box employs molding die of the type used to mold end sections 2, inset within a die wherein a constant cross section, selected length intermediate section is disposed therebetween to provide a box of predetermined length. Metal plates are inserted into grooved openings in the end walls of the box to permit its use in grounded systems, wherein the plates are electrically joined by a conductor strap. A metal cover is grounded to the metal plates or to the conductive strap. The metal plates can be substituted for by plastic plates when the load center is used in non-grounded applications. Additional openings in the end walls receive cable retention plates slidable into the opening to provide open pockets for laying in non-metallic sheathed cable. A second plate is slid in over the cables to retain them to the box. Additional pairs of cable retention plates may be used in each opening to provide one or more additional rows of pockets for cable. The end sections are particularly designed to have overlapping relation with the respective ends of the intermediate section. Sections are preferably joined together by bonding with an adhesive in the overlapped area, although ultrasonic welding, snap fastening structures and other attachment means are contemplated. Although a preferred embodiment and various alternative embodiments have been disclosed herein, it is to be understood that the plastic enclosure box of this invention is susceptible of various other modifications without departing from the scope of the appended claims.

We claim:

1. An enclosure for an electrical distribution panelboard comprising:
    a plastic box adapted to receive an electrical distribution panelboard, said box having a rear wall and opposed pairs of side walls and end walls extending forwardly from said rear wall defining a box having an open front side, and at least one opening in each wall of said opposed pair of end walls;
    a metal cover attached to said box over said open front side of said box; and
    grounding means comprising metal plates attached to said end walls of said box fully closing said at least one opening in said end walls, said plates having a knockout for attachment to a grounded conduit system, electrical conductor means within said box interconnecting said metal plates, and means conductively connecting said cover to said grounding means when said cover is positioned on said box over said open front side.

2. The enclosure for an electrical distribution panelboard defined in claim 1 wherein said means conductively connecting said cover to said grounding means comprises a tab disposed substantially flush against said cover at said front side of said box and a screw extending through aligned holes in said cover and said tab securing said tab against said cover.

3. The enclosure for an electrical distribution panelboard defined in claim 2 wherein said tab is located at a forward edge of at least one of said metal plates.

4. The enclosure for an electrical distribution panelboard defined in claim 3 wherein said tab is an integral portion of said metal plate bent substantially parallel to a major plane of said cover.

5. The enclosure for an electrical distribution panelboard defined in claim 2 wherein said electrical conducting means comprises at least one strap extending forwardly in said box and said tab is an integral portion of said strap.

6. The enclosure for an electrical distribution panelboard defined in claim 5 wherein said box comprises a plurality of holes in front surfaces of said pair of side walls, said cover comprises a plurality of holes aligned with respective ones of said plurality of holes in said side walls, said cover being secured to said box by screws extending through respective said holes in said cover and threadably engaging respective said holes in said side walls, and said tab is disposed between a front surface of said box and said cover, said hole in said tab being aligned with a respective one of said holes in said front surface of said box and a respective aligned hole in said cover whereby a respective one of said screws extends through said cover and said tab into said hole in said front surface of said box.

7. The enclosure for an electrical distribution panelboard defined in claim 1 wherein said means conductively connecting said cover to said grounding means comprises a tab located at a forward edge of at least one of said metal plates and disposed substantially flush against said cover.

8. The enclosure for an electrical distribution panelboard defined in claim 7 wherein said tab has a hole therethrough and said cover has a hole therethrough aligned with said hole in said tab further comprising a screw extending through said hole in said cover and threadably engaging said hole in said tab securing said tab against said cover.

9. The enclosure for an electrical distribution panelboard defined in claim 1 wherein said means conductively connecting said cover to said grounding means comprises a resilient conductive finger on said cover extending rearwardly from said cover, said finger engaging one of said metal plates.

10. The enclosure for an electrical distribution panelboard defined in claim 9 wherein said finger has a distal end and an angular cam surface on said distal end, said finger being resiliently deflected by engagement of said cam surface with a front edge of said metal plate during positioning of said cover to said plastic box.

11. An enclosure for an electrical distribution panelboard comprising:
   a plastic box adapted to receive an electrical distribution panelboard, said box having a rear wall and opposed pairs of side walls and end walls extending forwardly from said rear wall defining a box having an open front side, and at least one opening in at least one of said opposed pair of end walls, said opening extending through a forward edge of said end wall; and
   a plurality of cable retention plates attached to said end wall in a forwardly stacked relation covering said at least one opening, a forward edge on one said plate comprising a plurality of forwardly open cable-receiving pockets and a rear edge on an adjacent said plate comprising a plurality of rearwardly projecting fingers complementally shaped to said pockets and extending fully into said pockets, said fingers having breakaway distal ends for breaking said fingers to selected lengths, remaining portions of broken away fingers defining with a respective pocket a cable-receiving opening for receiving at least one electrical cable therein.

12. The enclosure for an electrical distribution panelboard defined in claim 11 wherein said edges of said pockets and said fingers compressively grip an exterior surface of said cable to retain said cable to said box.

13. The enclosure for an electrical distribution panelboard defined in claim 11 wherein said cable retention plates are slidably disposed in said at least one opening from said forward edge of said end wall.

14. The enclosure for an electrical distribution panelboard defined in claim 13 wherein said at least one opening comprises a pair of forwardly extending opposite edges, each of said edges having a groove therein extending forwardly and facing a corresponding groove in an opposite edge, said cable retention plates having opposite ends slidably received in said grooves.

15. The enclosure for an electrical distribution panelboard defined in claim 13 wherein said cable retention plates have complementally relieved edges which overlap when said plates are disposed in said at least one opening.

16. The enclosure for an electrical distribution panelboard defined in claim 15 wherein said pockets and said fingers have complementally relieved edges which overlap when said plates are disposed in said at least one opening.

17. The enclosure for an electrical distribution panelboard defined in claim 14 wherein said cable retention plates are sequentially disposed in said at least one opening in cooperative pairs with said first and second edges adjacent.

18. The enclosure for an electrical distribution panelboard defined in claim 14 wherein a cable retention plate having a second edge comprising a plurality of projecting fingers cooperating with pockets of a first edge of another plate also has a first edge comprising pockets for cooperation with fingers of yet another plate cooperating therewith.

19. The enclosure for an electrical distribution panelboard defined in claim 13 wherein said end wall and said cable retention plates comprise cooperable detent means for retaining said plates in said at least one opening.

* * * * *